United States Patent
Pirie et al.

(10) Patent No.: US 9,644,683 B2
(45) Date of Patent: May 9, 2017

(54) THERMAL MANAGEMENT OF BEARINGS IN HOT MAGNETIC SEPARATOR

(71) Applicant: Outotec (Finland) Oy, Espoo (FI)

(72) Inventors: Michael Pirie, Jessup, MD (US); Javier Castro, Jessup, MD (US)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 14/489,877

(22) Filed: Sep. 18, 2014

(65) Prior Publication Data

US 2016/0084314 A1  Mar. 24, 2016

(51) Int. Cl.
| | |
|---|---|
| *B03B 9/06* | (2006.01) |
| *F16C 37/00* | (2006.01) |
| *B03C 1/02* | (2006.01) |
| *B03C 1/247* | (2006.01) |
| *B03C 1/14* | (2006.01) |

(52) U.S. Cl.
CPC .............. *F16C 37/007* (2013.01); *B03C 1/02* (2013.01); *B03C 1/14* (2013.01); *B03C 1/145* (2013.01); *B03C 1/247* (2013.01); *F16C 37/00* (2013.01)

(58) Field of Classification Search
CPC .. B03C 1/005; B03C 1/10; B03C 1/14; B03C 1/145; B03C 1/03; B03C 1/247; F16C 34/00; F16C 34/002; F16C 34/005; F16C 34/007; F16C 33/1005

USPC ........ 209/3.2, 8, 11, 214, 215, 223.1, 223.2, 209/225, 226, 231
See application file for complete search history.

(56) References Cited

U.S. PATENT DOCUMENTS

| | | | | |
|---|---|---|---|---|
| 4,409,453 A | * | 10/1983 | Smith | .................... A21B 1/245 219/400 |
| 4,744,889 A | * | 5/1988 | Kruyer | ............... B01D 17/0202 209/49 |
| 7,478,727 B2 | | 1/2009 | Grey et al. | |

\* cited by examiner

*Primary Examiner* — Joseph C Rodriguez
*Assistant Examiner* — Kalyanavenkateshware Kumar
(74) *Attorney, Agent, or Firm* — Buchanan, Ingersoll & Rooney PC

(57) ABSTRACT

An apparatus for separating hot particles including a plurality of materials having different magnetic properties includes a plurality of permanent magnets arranged in a magnet assembly and configured to create a magnetic flux capable of providing a coercive force on at least a portion of the particles, the magnet assembly being mounted on a stationary shaft, a moving surface proximate the magnet assembly for carrying the particles in a downward path through the magnetic flux while the coercive force attracts the portion of the hot particles toward the moving surface, the moving surface being mounted on a drive shaft supported by a bearing, and an inert gas supply system which supplies inert gas into a gap between the stationary shaft and the drive shaft for cooling the drive shaft and the bearings, and into the magnet assembly for purging the magnet assembly of oxygen.

7 Claims, 4 Drawing Sheets

THERMAL MANAGEMENT OF BEARINGS IN HOT MAGNETIC SEPARATOR

TECHNOLOGICAL FIELD

The present invention relates generally to thermal management of bearings, particularly in a hot magnetic separator.

BACKGROUND DISCUSSION

There is a significant need to magnetically separate materials at as high a temperature as feasible. The upper limit for the temperature of this magnetic process is the Curie point or Curie temperature of the magnetic components of the mixture, which is the point where certain magnetic materials undergo a sharp change in the magnetic properties of the material. In particular, certain hot magnetic separation processes need to manage feed temperatures of up to about 700 to 800 degrees C.

A hot magnetic separator apparatus is disclosed in U.S. Pat. No. 7,478,727, the entire content of which is incorporated by reference herein. In the hot magnetic separator apparatus of U.S. Pat. No. 7,478,727, graphite alloy bushings are used to deal with the excessive heat. However, graphite alloy bushings are more expensive to install and replace than conventional bearings. Accordingly, a need exists for a hot magnetic separator apparatus having a configuration in which conventional bearings can be used.

SUMMARY

The disclosure here involves an apparatus for separating hot particles including a plurality of materials having different magnetic properties. The apparatus includes a plurality of permanent magnets arranged in a magnet assembly and configured to create a magnetic flux capable of providing a coercive force on at least a portion of the particles, the magnet assembly being mounted on a stationary shaft, a moving surface proximate the magnet assembly for carrying the particles in a downward path through the magnetic flux while the coercive force attracts the portion of the hot particles toward the moving surface, the moving surface being mounted on a drive shaft supported by bearings; and an inert gas supply system which supplies inert gas into a gap between the stationary shaft and the drive shaft for cooling the drive shaft and the bearings, and into the magnet assembly for purging the magnet assembly of oxygen.

In an embodiment, a housing encloses the magnet assembly and the moving surface, and the bearing is disposed outside the housing.

In an embodiment, an opening in the stationary shaft allows the inert gas to flow to atmosphere.

In an embodiment, the inert gas is further supplied to an interior of the magnet assembly.

In an embodiment, a feed system supplies the particles onto the moving surface.

In an embodiment, a control system controls the temperature of the particles supplied by the feed system.

In an embodiment, the control system controls the feed system based on one or more monitored temperatures of the apparatus.

In an embodiment, a splitter below the moving surface selectively divides particles of less magnetic strength from those of greater magnetic strength.

In an embodiment, the moving surface moves in a curved path.

BRIEF DESCRIPTION OF THE DRAWING FIGURES

Additional features and aspects of the hot magnetic separator disclosed here will become more apparent from the following detailed description considered with reference to the accompanying drawing figures in which like elements are designated by like reference numerals.

DETAILED DESCRIPTION

Figure 1:
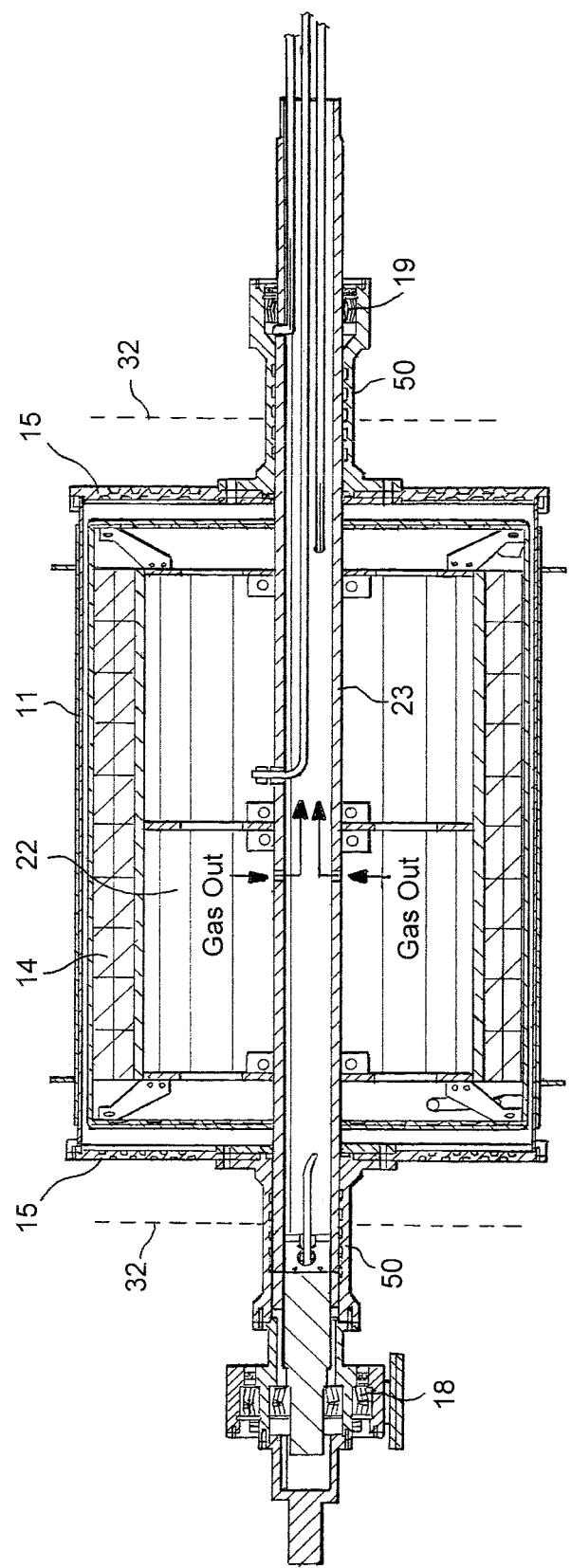
FIG. 1 is a partial cross-sectional view of the hollow shaft and drum assembly of a hot magnetic separator.

An embodiment of the apparatus for separating hot particles including a plurality of materials having different magnetic properties is illustrated in FIGS. 1-4. As illustrated in FIG. 1, the apparatus includes a plurality of permanent magnets 14 arranged in a magnet assembly 22. The magnets 14 create a magnetic flux capable of providing a coercive force on at least a portion of the hot particles fed into the apparatus.

The apparatus also includes a moving surface/shell 11 proximate the magnet assembly 22. A pair of end plates 15 are joined to the respective opposite side openings of the shell 11. The shell 11 and end plates 15 together form a drum 10 and are either in contact with the high temperature feed material or are very near it. These parts must be designed and made to withstand the high temperatures, abrasive nature, and significant thermal expansion that are caused by a temperature change of up to 700 to 800 degrees C. To combat this, high nickel super-alloys, commonly known in the industry, are the chosen materials for the shell 11 and end plates 15.

Figure 4:
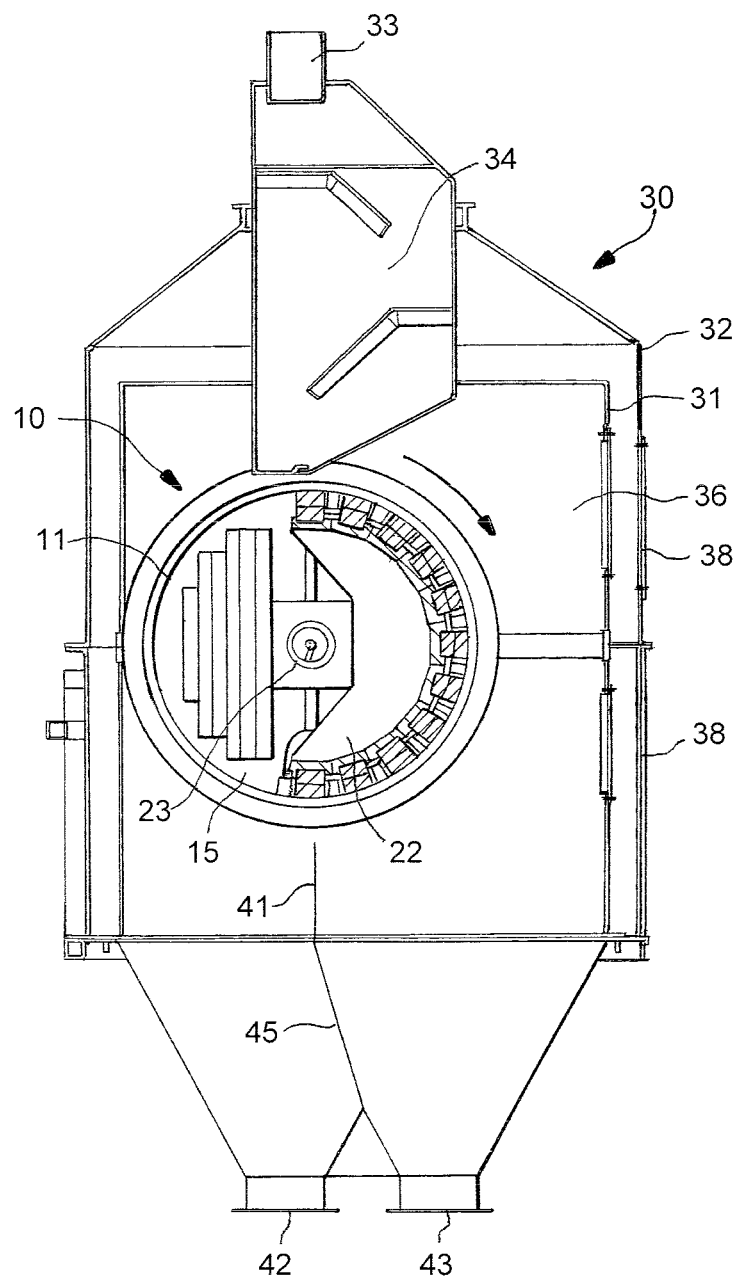
FIG. 4 is a cross-sectional view across the hot magnetic separator of the embodiment.

As illustrated in FIG. 4, the shell 11 is cylindrical and carries the particles in a downward path through the magnetic flux while the coercive force attracts the portion of the hot particles toward the shell 11. And as illustrated in FIG. 1, the end plates 15 are fixed to hollow drive shafts 50. One of the drive shafts (the left drive shaft 50 in FIG. 1) is driven by a motor to thereby rotate the drum 10. In the embodiment, the left drive shaft is supported by at least one bearing which, in the embodiment, is nested roller bearings 18. The other drive shaft (the right drive shaft 50 in FIG. 1) is driven by the drum 10 and is supported by at least one bearing which, in the embodiment, is a single roller bearing 19. In the embodiment, the shell 11 rotates (i.e., moves in a curved path) to thereby carry the particles in the downward path.

FIG. 4 also illustrates a feed system (i.e., feed connection 33 and feed chute 34) for supplying the particles onto the shell 11. The drum 10 and drive shafts 50 rotate about a stationary shaft 23 on which the magnet assembly is mounted. The free end of the stationary shaft 23 (the right side in FIG. 1) provides the passage for the supply of cooling gas. The temperature at various locations in the system is monitored by, for example, thermocouple wires which extend through the shaft 23. In some embodiments, the feed system is controlled by a control unit, such as a programmed processor, based on the temperature data to control the temperatures of the particles fed by the feed system.

The apparatus also includes a cooling system for maintaining the temperature of the magnets 14 substantially below their Curie point. In particular, the cooling system includes a circuit for routing liquid coolant in the space between the magnet assembly 22 and the shell 11.

Figure 2:
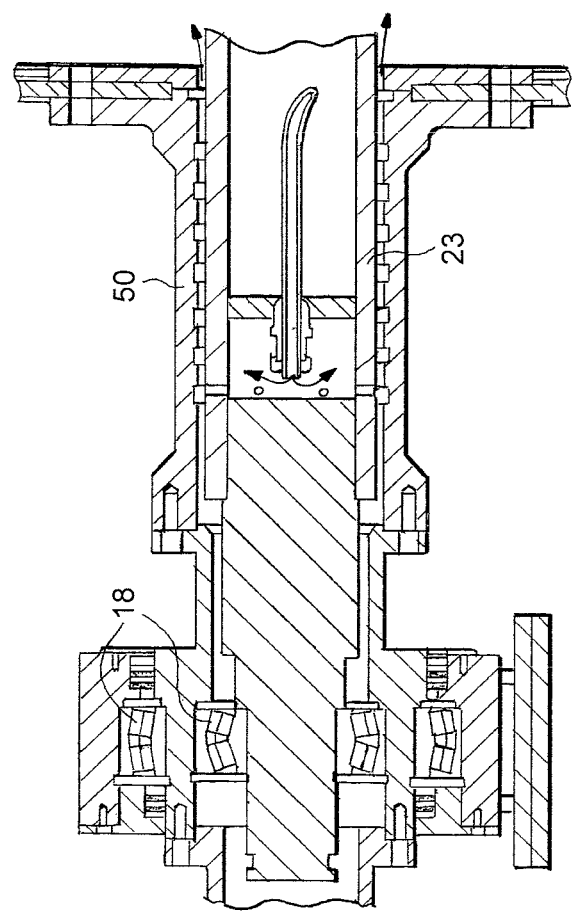
FIG. 2 is a detailed view of the drive side of FIG. 1.
Figure 3:
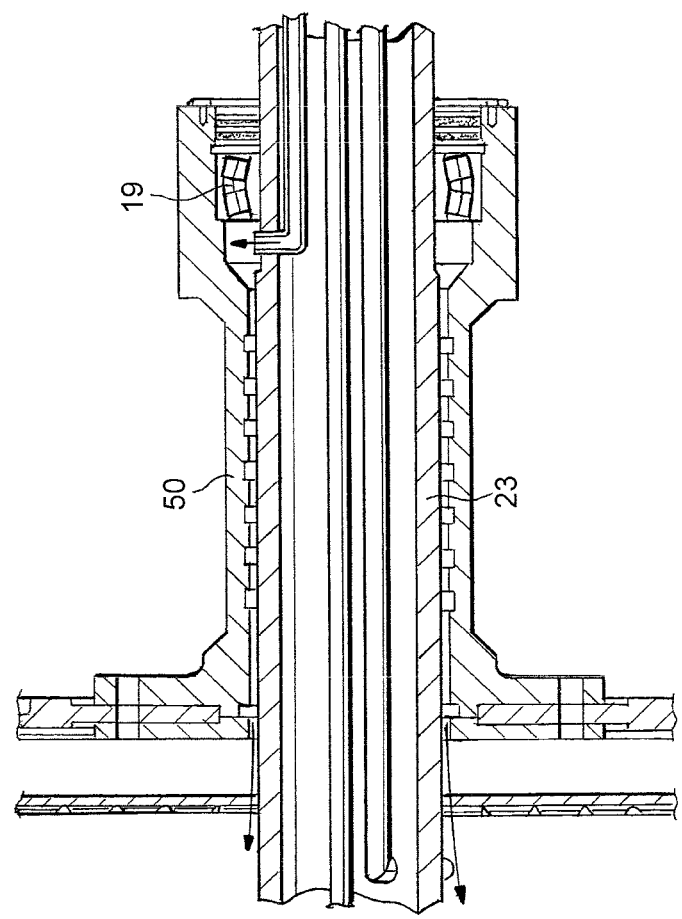
FIG. 3 is a detailed view of the driven side of FIG. 1.

As illustrated in FIG. 2, a cooling system is also provided to cool the drive shaft and the bearings. In this system, a supply of inert cooling gas, such as nitrogen, is fed within the stationary shaft 23 to the drive side, and non-drive side. Openings in the drive side and non-drive side of the stationary shaft 23 permit the cooling gas to enter a space between the drive side drive shaft 50 and the non-drive side drive shaft 50 and the stationary shaft 23 to thereby cool the drive side drive shaft 50 and the nested bearings 18 (FIG. 2), and the non-drive side drive shaft 50 and the single bearing 19 (FIG. 3). This space leads to the interior of the magnet assembly 22, the inert gas thereby purging the magnet assembly 22 of oxygen and helping remove heat transferred from the inside of the shell 11 and end plate 15 to the gas spaces inside the drum 10. As illustrated in FIG. 1 and FIG. 3, the inert gas that enters from both sides of the shaft will then exit through a hole in the stationary shaft 23 and flow to atmosphere through the center of the shaft.

As illustrated in FIG. 4, the apparatus is defined by a housing 30 having an interior space defining a processing zone which includes various components of the apparatus including the magnet assembly 22 and the cooling system. The housing 30 thus maintains the processing zone at an elevated temperature and substantially filled with the inert gas. The housing is preferably provided with an inner wall 31, an outer wall 32, and an inspection door 38. The bearings 18 and 19 are spaced well apart, for example, 500 mm, from the end plates 15, and are outside the housing 30. For example, as illustrated in FIG. 1, the bearings 18 and 19 are disposed outside the outer walls 32. The heat to the bearings is thus reduced due to their distance from the hot drum 10 and their location outside the housing 30. The forcing of inert gas in the annulus between the shafts 23 and 50 further cools the bearings 18 and 19. And the relatively long, thin-walled shape of the drive shafts 50 and their rotational movement further enhances heat dissipation. With this configuration, the bearings can be kept to a temperature at or below 200 degrees C., and thus conventional bearings, such as roller bearings, can be used. And because the bearings 18, 19 are disposed outside the housing 30, they are more easily replaced than if they were disposed within the housing 30.

The apparatus further includes a splitter 41 located below the shell 11 for selectively dividing particles of less magnetic susceptibility from those of greater magnetic susceptibility. The position of the splitter 41 relative to the drum 10 allows it to divide particles of less magnetic susceptibility and particles of greater susceptibility into appropriate chutes 45 for further handling as appropriate via respective material collectors 42, 43. The splitter 41 and chutes 45 are arranged so that material having different levels of attraction to the magnet assembly 22 will land in different respective collectors 42, 43.

The detailed description above describes features and aspects of embodiments of a hot magnetic separator disclosed by way of example. The invention is not limited, however, to the precise embodiments and variations described. Changes, modifications and equivalents can be employed by one skilled in the art without departing from the spirit and scope of the invention as defined in the appended claims. It is expressly intended that all such changes, modifications and equivalents which fall within the scope of the claims are embraced by the claims.

What is claimed is:

1. An apparatus for separating hot particles including a plurality of materials having different magnetic properties, the apparatus comprising:
    a plurality of permanent magnets arranged in a magnet assembly and configured to create a magnetic flux capable of providing a coercive force on at least a portion of said particles, said magnet assembly being mounted on a stationary shaft;
    a moving surface proximate said magnet assembly for carrying said particles in a downward path through said magnetic flux while said coercive force attracts said portion of said hot particles toward said moving surface, said moving surface being mounted on a drive shaft supported by bearings, an outer surface of said stationary shaft and an inner surface of said drive shaft defining an annular gap therebetween;
    an inert gas supply system which supplies an inert gas flow, via a line disposed within an interior of said stationary shaft, into said annular gap for cooling said drive shaft and at least one of said bearings and for purging an interior of said magnet assembly of oxygen, said annular gap being disposed between said at least one of said bearings and said magnet assembly so as to divide said inert gas flow into a first portion which is introduced to said at least one of said bearings and a second portion which is introduced to said interior of said magnet assembly; and
    an opening in the stationary shaft which defines an inert gas flow path from the interior of said magnet assembly to the interior of the stationary shaft, whereby said first portion of inert gas flow flows from the interior of said magnet assembly to the interior of the stationary shaft, and then from the interior of the stationary shaft to atmosphere,
    wherein said second portion of inert gas flow introduced to said at least one of said bearings flows from said at least one of said bearings to atmosphere without flowing through the interior of the stationary shaft.

2. The apparatus as defined in claim 1 further including a housing enclosing the magnet assembly and the moving surface, wherein said at least one of said bearings is disposed outside the housing.

3. The apparatus as defined in claim 1 further including a feed system for supplying said particles onto said moving surface.

4. The apparatus as defined in claim 3 further including a control system for controlling the temperature of said particles supplied by said feed system.

5. The apparatus as defined in claim 4 wherein the control system controls the feed system based on one or more monitored temperatures of the apparatus.

6. The apparatus as defined in claim 1 further including a splitter below said moving surface for selectively dividing particles of less magnetic strength from those of greater magnetic strength.

7. The apparatus as defined in claim 1 wherein said moving surface moves in a curved path.

* * * * *